(12) United States Patent
Thorson et al.

(10) Patent No.: US 8,611,706 B1
(45) Date of Patent: Dec. 17, 2013

(54) MICRO ELECTRO MECHANICAL SYSTEM OPTICAL SWITCHING

(75) Inventors: Kevin J. Thorson, Eagan, MN (US); Rick C. Stevens, Apple Valley, MN (US); Charles J. Kryzak, Liverpool, NY (US); Brian S. Leininger, Arlington, VA (US); William P. Kornrumpf, Schenectady, NY (US); Glenn A. Forman, Niskayura, NY (US); Joseph A. Iannotti, Glenville, NY (US); Olga B. Spahn, Albuquerque, NM (US); William D. Cowan, Albuquerque, NM (US); Daryl J. Dagel, Rapid City, SD (US)

(73) Assignee: Lockheed Martin Corporation, Bethesda, MD (US)

( * ) Notice: Subject to any disclaimer, the term of this patent is extended or adjusted under 35 U.S.C. 154(b) by 41 days.

(21) Appl. No.: 12/291,428

(22) Filed: Nov. 10, 2008

Related U.S. Application Data

(60) Provisional application No. 61/002,474, filed on Nov. 9, 2007.

(51) Int. Cl.
*G02B 6/26* (2006.01)
*G02B 6/42* (2006.01)

(52) U.S. Cl.
USPC .......................................................... 385/18

(58) Field of Classification Search
USPC ........................................................ 385/15–19
See application file for complete search history.

(56) References Cited

U.S. PATENT DOCUMENTS

| 5,960,132 | A  | * | 9/1999  | Lin .................................. 385/18 |
| 6,430,328 | B1 | * | 8/2002  | Culver et al. ................... 385/16 |
| 6,556,318 | B1 | * | 4/2003  | Goldstein et al. ................ 398/9 |
| 6,587,611 | B1 | * | 7/2003  | Hunt ................................ 385/18 |
| 6,794,793 | B2 | * | 9/2004  | Miller et al. .................. 310/309 |
| 7,136,547 | B2 | * | 11/2006 | Brown et al. .................... 385/16 |
| 2002/0181839 | A1 | * | 12/2002 | Brown et al. .................... 385/16 |
| 2003/0029705 | A1 | * | 2/2003  | Qiu et al. ....................... 200/181 |
| 2003/0048979 | A1 | * | 3/2003  | Beerling et al. ................. 385/18 |

* cited by examiner

*Primary Examiner* — Charlie Peng
*Assistant Examiner* — Mary El Shammaa
(74) *Attorney, Agent, or Firm* — Brooks, Cameron & Huebsch, PLLC

(57) ABSTRACT

The present disclosure includes apparatus, system, and method embodiments that provide micro electro mechanical system optical switching and methods of manufacturing switches. For example, one optical switch embodiment includes at least one micro electro mechanical system type pivot mirror structure disposed along a path of an optical signal, the structure having a mirror and an actuator, and the mirror having a pivot axis along a first edge and having a second edge rotatable with respect to the pivot axis, the mirror being capable of and arranged to be actuated to pivot between a position parallel to a plane of an optical signal and a position substantially normal to the plane of the optical signal.

15 Claims, 14 Drawing Sheets

MICRO ELECTRO MECHANICAL SYSTEM OPTICAL SWITCHING

PRIORITY DATA

This application claims priority from U.S. Provisional Application Ser. No. 61/002,474 filed Nov. 9, 2007, which is a continuation-in-part of U.S. Pat. No. 7,295,727, issued on Nov. 13, 2007, the entire content of which is incorporated herein by reference.

GOVERNMENT RIGHTS

The subject matter of this disclosure was made with government support under Contract No.: DE-AC04-94AL85000 awarded by the U.S. Department of Energy and CRADA No. SC99/01573. Accordingly, the U.S. Government has certain rights to subject matter disclosed herein.

FIELD OF THE PRESENT DISCLOSURE

The present disclosure generally relates to the fiber optic communications and particularly to micro-electro-machined system (MEMS) optical switching.

BACKGROUND

Fiber optic transmission systems typically utilize an optoelectronic source such as a light emitting diode (LED) or a vertical cavity surface emitting laser (VCSEL) to generate optical signals for communication purposes. The optical signals are transmitted, for example, along optical glass fibers or through free space to a receiver, such as a diode or similar communications device. Such receivers can, for example, convert the optical signal to electrical signals or forward the signal on to other system components for analysis of the signal, further handling, and/or processing.

Such systems often utilize one or more methods for diagnosing problems among the individual optical lines and/or the optoelectronic devices of the system. In many instances these methods can be accomplished by disconnecting a portion of the network and attaching a diagnostic component thereto. This may result in system or component downtime which may be unsuitable in some instances, among other issues.

Additionally, a number of factors can impact the efficiency of an optical communication system including the quality of the optical signal produced by the optoelectronic device and the construction and alignment of the optical path. For example, in many systems, the optical device ports (e.g., input/output ports for optical signals to enter one or more of the optical fibers or devices of the system) must be aligned.

For instance, in many applications, the device ports and optical fibers and/or the optical fibers, connectors, and/or transceiver packages must be properly aligned. In applications where one or more mirrors are utilized, it may be difficult to properly align the mirrors with respect to the optical signal that is to interact with the mirror.

For example, in moving a mirror from a flat position to an upright position, the mirror may be difficult to raise to the precise desired position. Often hard stops are used to stop the mirror in the correct position, but these hard stops may damage the mirror or the actuation components due to the hard stopping force applied.

Further, components can lose effectiveness as they age, become worn, and/or dirty and, therefore, diagnostic systems can aid in determining where and/or how serious a fault in the system may be.

In some optical systems, MEMS switches can be utilized to direct an optical signal through the use of one or more mirrors. These MEMS devices may be very small and delicate to handle. Accordingly, in some fabrication methods, the handling of the MEMS device separately from a submount can damage the MEMS device before it is fully assembled.

Additionally, in some instances the size of a switching component may be important. For example, many optical communication systems utilize a mechanically transferable (MT) connector. These connectors typically have a standard size form factor and it may be desirable in some instances to provide a switch that can be sized to maintain this standard sized form factor. This can be beneficial in applications where the optical communications system and/or surrounding fixtures and/or hardware, are designed to accommodate only that size form factor.

In some instances there also may be a need to be able to determine whether an individual fiber optic connection or optical fiber is providing the desired or required signal quality. Accordingly, in some systems, it may be advantageous to selectively monitor the performance of an optoelectronic device without disconnecting the array from the optical pathway.

Such a system could, for example, eliminate costly down time and testing costs that may be required to diagnose each individual fiber and/or devices off-line. Furthermore, a switch could reduce or eliminate the potential for further damaging a system during a test procedure, among other benefits.

SUMMARY

The present disclosure includes a number of apparatus, system, and method embodiments for micro-electro-machined system (MEMS) optical switching and the manufacturing of such apparatuses and systems. For instance, the present disclosure includes apparatus embodiments, such as a number of optical switch embodiments. In some such embodiments, the switch can have at least one MEMS type pivot mirror structure disposed along a path of an optical signal, the structure can, for example include one or more mirrors and one or more actuators.

An actuator can be any suitable actuation mechanism. For example, in various embodiments, a mirror can be constructed having a spring force as an actuator that moves the mirror from the position substantially normal to the plane of the optical signal to the position parallel to the plane of the optical signal or vice versa.

In such embodiments, the spring force can, for example, be a mechanical spring or can be inherent in the design of the mirror and its attachment to a substrate and/or can be based upon one or more materials used to construct the mirror or its connection to the substrate. For example, resilient or semi-resilient materials can be utilized.

In some embodiments, the mirror can be constructed having a thermally actuated pivot mechanism as the actuator that moves the mirror from the position parallel to the plane of the optical signal to the position substantially normal to the plane of the optical signal. Some embodiments can utilize an electric and/or magnetic force to move one or more mirrors. In such embodiments, the attachment to a substrate may be via a resilient or semi-resilient material or may have a hinge structure to allow the mirror to pivot.

Such embodiments also include the mirror having a pivot axis along a first edge and having a second edge rotatable with respect to the pivot axis, the mirror being capable of and arranged to be actuated to pivot between a position parallel to a plane of an optical signal and a position substantially normal to the plane of the optical signal. In various embodiments, the mirror can be constructed having a electro-static zipper actuated pivot mechanism as the actuator that moves the mirror from the position parallel to the plane of the optical signal to the position substantially normal to the plane of the optical signal.

In some embodiments, the mirror can be constructed having a nano-tractor actuated pivot mechanism as the actuator that moves the mirror from the position parallel to the plane of the optical signal to the position substantially normal to the plane of the optical signal. Other actuation mechanisms can be used and the above examples should not be viewed as limiting the embodiments of the present disclosure.

In various embodiments, the mirror can be planar and can have an optimal angle of 90 degrees to the plane of the optical signal in at least one special dimension. The use of such embodiments can reduce cost, and/or increase precision of positioning, in some applications.

As discussed above, the present disclosure also includes a number of system embodiments. For example, in some embodiments, an optical switching system having at least one MEMS type pivot mirror structure disposed along a path of an optical signal, the structure having a mirror and an actuator.

Such embodiments can also include where the mirror has a pivot axis, as discussed above, along a first edge and having a second edge rotatable with respect to the pivot axis, the mirror being capable of and arranged to be actuated to pivot between a position parallel to a plane of an optical signal and a position where at least a portion of the mirror is rotated into the plane of the optical signal. Embodiments can also include where the system has a number of optical input paths for directing the optical signal toward at least one of the pivot mirror structures and, in various embodiments, a number of optical output paths for receiving the optical signal from at least one of the pivot mirror structures.

System embodiments can include one or more control logic components for actuating one or more of the at least one mirror structures via an actuator. In various embodiments, a control logic component can include logic instructions executable for actuating one or more of the at least one mirror structures such that the optical signal is directed to a bypass output to bypass a particular optical output path when a fault in the particular output path has been detected. Such embodiments can be suitable in systems where an optical fiber may become broken or an optical connection may become dirty, for example.

In some embodiments, the control logic component can include logic instructions executable for actuating one or more of the at least one mirror structures such that the optical signal is routed to a particular output based upon instructions received by the control logic component. Such embodiments can be utilized for switching a signal from one optical pathway to another. This may be useful for message routing or for diagnostics, among other implementations.

Embodiments can also include multiple units each having at least one MEMS type pivot mirror structure disposed along a path of an optical signal, the structure having a mirror and an actuator. In such embodiments, the mirror can have a pivot axis along a first edge and having a second edge rotatable with respect to the pivot axis, the mirror being capable of and arranged to be actuated to pivot between a position parallel to a plane of an optical signal and a position where at least a portion of the mirror is rotated into the plane of the optical signal.

Such embodiments can also include a number of optical input paths for directing the optical signal toward at least one of the pivot mirror structures and/or a number of optical output paths for receiving the optical signal from at least one of the pivot mirror structures. In such embodiments, the control logic component can include logic instructions executable for actuating one or more of the at least one mirror structures on a first unit of the multiple units such that the optical signal is routed to a particular output on a second unit of the multiple units based upon instructions received by the control logic component. Although a larger device having more mirrors can be used, such embodiments can enable a larger network to utilize the functionalities of a larger device by employing multiple smaller devices. This can be beneficial because of space constraints, cost constraints, per device power requirements, or other factors, for instance.

System embodiments can also include a number of lenses for receiving optical signal information directed at the system in free space, each of the number of lenses positioned to direct the optical signal information to one of the number of optical input paths. Lenses can be used in a variety of locations within a system of the present disclosure and can be used to focus, isolate, and/or disburse an optical signal depending upon the needs of the system, the type of lens used, and the positioning of the lens. Lenses can be arranged as individual units or as arrays for directing single or multiple parallel optical signals.

In some system embodiments, the control logic component includes logic instructions executable for analyzing an affect of an interaction of a mirror with an environmental condition. A control logic component can include logic instructions executable for actuating one or more of the at least one mirror structures to direct a portion of the optical signal away from all of the optical output paths. Such embodiments can be beneficial, for example, to reduce the overall light (e.g., saturation) passing through the system.

For instance, in some applications, an optical signal may have such great intensity that the signal within the optical beam is obscured by noise created from the intensity or by the receiver being overwhelmed by the intensity. Accordingly, by reducing the overall light passing through the system, such effects may be reduced or eliminated in some instances.

In various embodiments, the control logic component can include logic instructions executable for adjusting a mirror structure alignment to a beyond optimal position for optical communication and instructions to adjust the mirror structure alignment back to the optimal position from the beyond optimal position. Such embodiments may offer a longer life cycle and more accurate positioning than hard stop type mirror structures in some applications, among other benefits.

Embodiments can include one or more control logic components, for example, having logic instructions executable for adjusting mirror structure alignment by analyzing a signal strength via utilizing a number of signal strength measurements taken over one or more periods of time. This can be accomplished, for example, by defining a particular input path from a number of optical input paths, one or more particular mirror structures of one or more mirror structures, and a particular output path of a number of optical output paths.

By monitoring the same path over time, performance and/or other characteristics of the optical signal and/or the system can be monitored and checked. The information can be utilized by comparing two measurements of the same signal path, measurements of different signal paths, and/or one or more measurements and a standard measurement (e.g., stored in memory, in hardware, and/or firmware in an optical device).

The control logic component can include logic instructions executable for actuating the one or more particular mirror structures to adjust an amount of rotation for at least one of the one or more particular mirror structures based upon the analysis. In some such embodiments, the control logic component can include logic instructions executable for comparing the number of signal strength measurements taken over the first period of time and a second period of time and where the control logic component includes logic instructions executable for determining whether the adjustment based upon the analysis of the signal strength measurements over the first period of time increased or decreased the signal strength and where the control logic component includes logic instructions executable for actuating the one or more particular mirror structures adjust an amount of rotation for at least one of the one or more particular mirror structures based upon the determination.

MEMS substrate fabrication is generally explained by *Embedded micromechanical devices for the monolithic integration of MEMS with CMOS*, J. Smith, S. Montague, J. Sniegowski, J. Murray, and P. McWhorter, Proc. IEDM 1995, pp. 609-612, 1995. This fabrication process allows for an integrated microelectronic control system and micromachined mirror drive systems all on one chip. Although such techniques provide background with respect to manufacturing, the present disclosure includes a number of method embodiments that change such techniques to allow for better handling of the MEMS device during fabrication, in some instances.

As discussed above, the present disclosure also includes a number of method embodiments. For example, in some method embodiments, the method includes forming at least one MEMS on a substrate and forming at least one die submount.

In some embodiments, the substrate can be diced, for example, to singulate each MEMS to form at least one MEMS die (e.g., having one or more MEMS on each diced portion of the substrate. The at least one MEMS die can be attached to one of the at least one submounts, performing a release on the MEMS die while it is attached to the submount, and wirebonding the MEMS die to the submount to form a MEMS device. By accomplishing the release before attaching the die to the submount, wear and tear on the device can be reduced or eliminated, since the amount of handling and exposure to the release process by other components is reduced, in some instances.

In various embodiments, a method can include testing the MEMS device to determine its electrical and mechanical performance. Embodiments can include preparing at least one optical subassembly and/or mounting the at least one optical subassembly onto the MEMS device. Some method embodiments can include integrating the at least one optical subassembly into the MEMS device.

DETAILED DESCRIPTION

In the following description of various example embodiments, reference is made to the accompanying drawings which form a part hereof, and in which is shown by way of illustration various manners in which embodiments of the present disclosure may be practiced. It is to be understood that other embodiments may be utilized, as structural and operational changes may be made without departing from the scope of the present disclosure.

Figure 1:
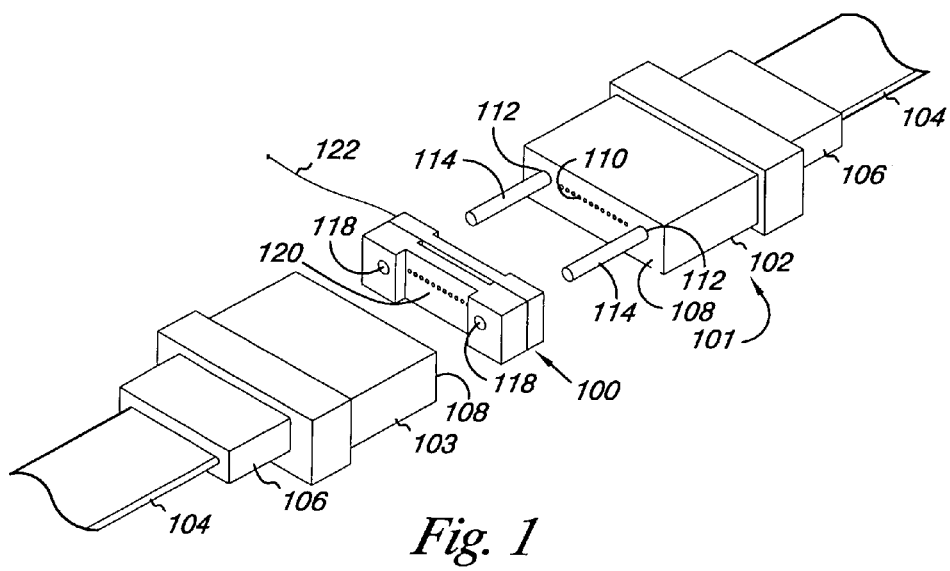
FIG. 1 is an exploded perspective view a switch embodiment of the present disclosure disposed between two MT connectors.

FIG. 1 is an exploded perspective view a switch embodiment of the present disclosure disposed between two MT connectors. As illustrated in FIG. 1, the switch (e.g., an in-line diagnostic tool) 100 of the present disclosure can be disposed between a MT connector unit 101 that includes a male MT connector 102 and female MT connector 103. A fiber ribbon 104 containing the individual optical fibers is inserted into a boot 106 for integration with an MT connector 101.

Both the male MT connector 102 and the female MT connector 103 have a mating face 108 on which are disposed a plurality of fiber ports 110 corresponding to the number of individual fibers contained in ribbon 104. The MT connector 101 in FIG. 1 includes 12-lines.

MT connector 101 in some embodiments may contain a variety of layouts including designs with sixty lines in five stacks of twelve, among many other configurations. The switch 100 can be formatted to handle any combination of single or stacked line layouts, among others. Also disposed on mating face 108 is a pair of precisely aligned guide holes 112 from which one male MT connector 102 guide pins 114 extend.

Alignment of fiber optic switch 100 can be accomplished, for example, by inserting guide pins 114 through alignment holes 118 and on into the mating guide holes (not shown, but can be viewed as similar to holes 112) in the female MT connector 103. Once aligned, the fiber lines 110 of the male MT connector 102 align with the internal optical pathway of fiber optic switch 100. The fiber ports 110 on the female MT connector 103 align with the output lens array 120 of the switch 100.

A switch device can be of various shapes, but can, as illustrated in FIG. 1, be generally a rectangular box dimensioned with a depth sufficient to maintain alignment upon guide pin 114 insertion. An electrical conductor 122 is attached to the switch 100 124 to provide power to a mirror assembly including one or more mirrors, as will be described in more detail below. Power can also be provided by other sources, such as by an opto-electrical converter.

As discussed above, a number of lenses can be utilized in an optical system of the present disclosure. In the embodiment of FIG. 1, an output lens array 120 is provided on the switch 100. This lens array can be used for a variety of functions as described above.

Figure 2A:
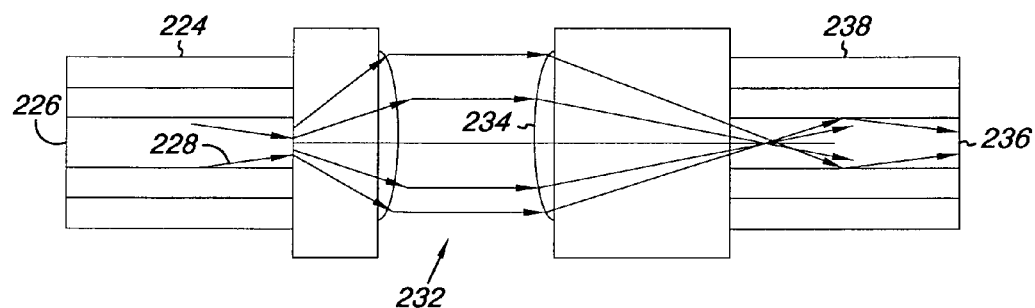
FIG. 2A is a representation of the movement of light through one optical path of an embodiment of the present disclosure where the path includes an optical fiber, a first lens assembly, free space, a second lens assembly, and another optical fiber.

FIG. 2A is a representation of the movement of light through one optical path of an embodiment of the present disclosure where the path includes an optical fiber, a first lens assembly, free space, a second lens assembly, and another optical fiber. In some embodiments of the present disclosure, an optical signal can be received by an optical path of the switch in a number of manners.

For example, in the embodiment of FIG. 2A, the optical signal 228 (formed by a number of light waves within one or more beams of light) propagates through an optical channel 226 within an optical fiber 224 (e.g., one of the fibers with ribbon 104 of the embodiment of FIG. 1). The optical signal then passes through free space 232 and into another optical channel 236 within optical fiber 238.

In some embodiments, as is illustrated in FIG. 2A, one or more lenses 234 can be used to alter the path of the optical signal. The described procession through the components of the switch forms an optical path.

Figure 2B:
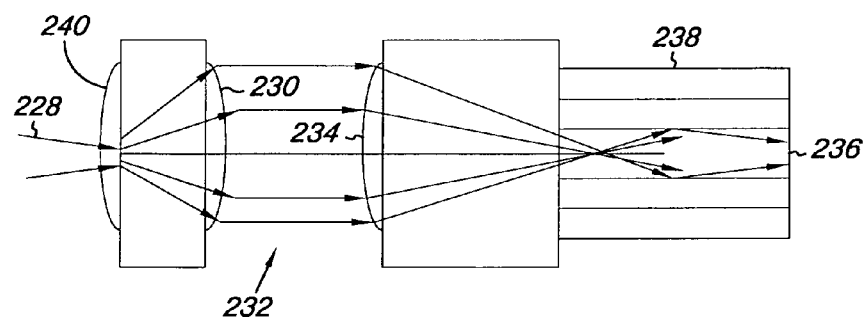
FIG. 2B is a representation of the movement of light through one optical path of an embodiment of the present disclosure where the path includes free space, a first lens assembly, a second lens assembly, free space, a third lens assembly, and an optical fiber.

FIG. 2B is a representation of the movement of light through one optical path of an embodiment of the present disclosure where the path includes free space, a first lens assembly, a second lens assembly, free space, a third lens assembly, and an optical fiber. In contrast, in the embodiment of FIG. 2B, the optical signal 228 (formed by a number of light waves within one or more beams of light) propagates into a lens 240.

The optical signal then passes through free space 232 and into another optical channel 236 within optical fiber 238. In some embodiments, as is illustrated in FIG. 2B, one or more other lenses 234 can be used to alter the path of the optical signal.

Figure 3A:
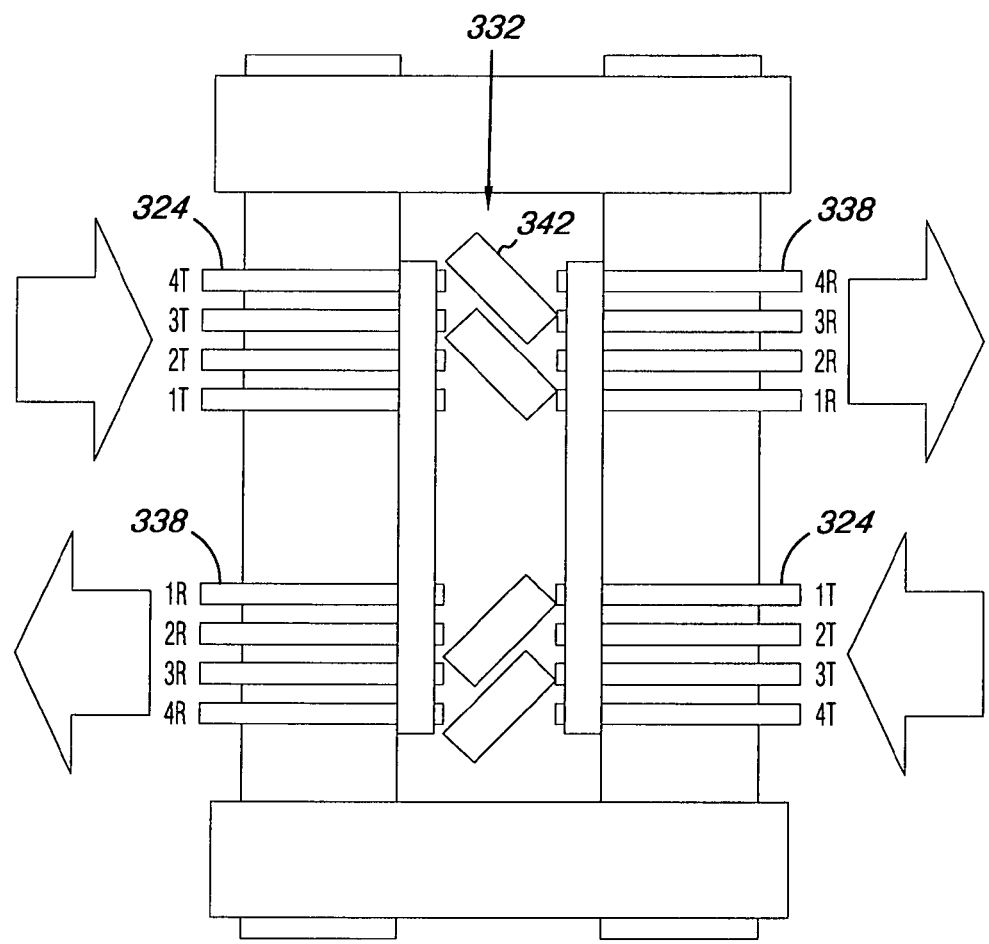
FIG. 3A is an illustration of a switch having a number of mirrors in a non-actuated position provided therein according to an embodiment of the present disclosure.

FIG. 3A is an illustration of a switch having a number of mirrors in a non-actuated position provided therein according to an embodiment of the present disclosure. In the embodiment of FIG. 3A, the switch includes multiple inputs 324 (i.e., a left side group of inputs 1T-4T and a right side group of inputs 1T-4T). The switch of FIG. 3A also includes multiple outputs 338 (i.e., a left side group of outputs 1R-4R and a right side group of outputs 1R-4R).

In the embodiment of FIG. 3A, the switch also includes a free space area 332 having a number of mirrors therein. In the configuration illustrated in FIG. 3A, the mirrors 342 are oriented in a position that is parallel to the plane of the optical signal in at least one dimension. In this configuration, all optical signals that are input into the switch pass straight across the free space 332 and into a corresponding output (i.e., an optical signal entering from the left via fiber 4T pass through the free space 332 and into output 4R on the right side of the switch).

Figure 3B:
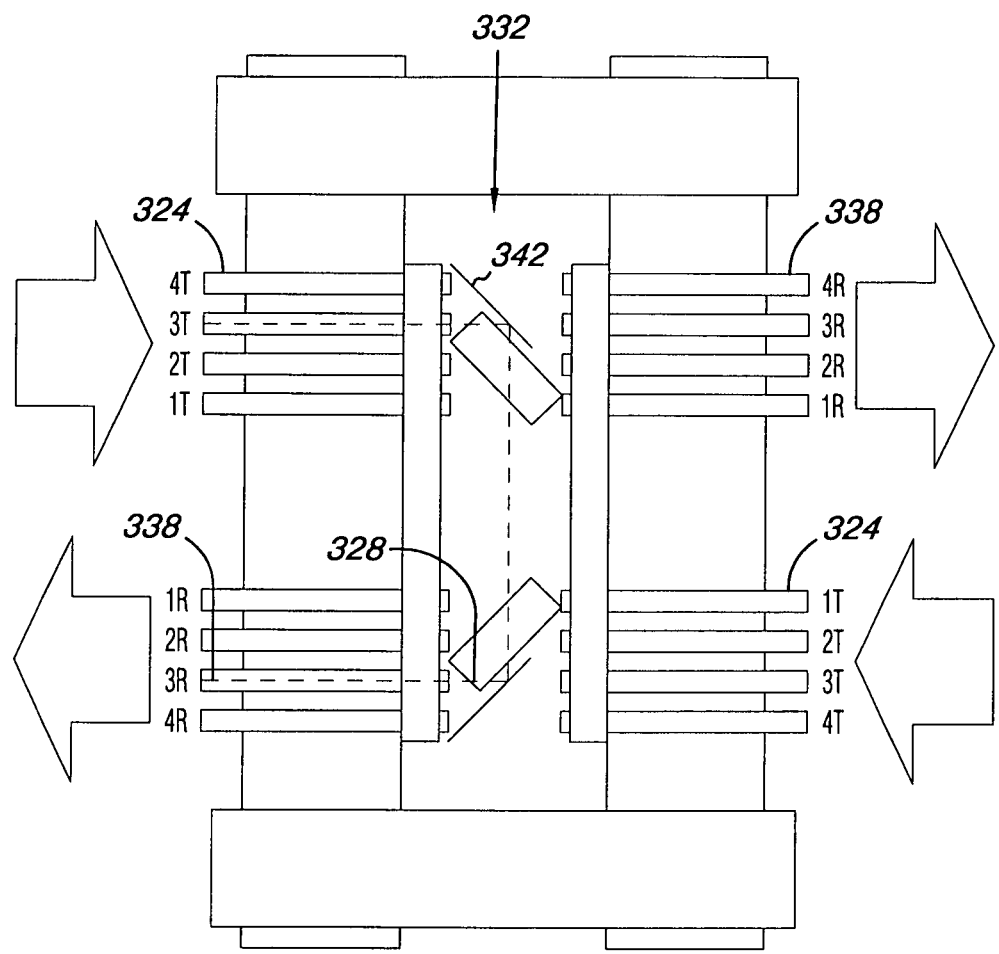
FIG. 3B is an illustration of a switch having a number of mirrors in a non-actuated position and a number of mirrors in an actuated position provided therein according to an embodiment of the present disclosure.

FIG. 3B is an illustration of a switch having a number of mirrors in a non-actuated position and a number of mirrors in an actuated position provided therein according to an embodiment of the present disclosure. In the configuration illustrated in FIG. 3B, two of the mirrors 342 are oriented in a position that is normal to the plane of the optical signal in at least one dimension.

In this configuration, the optical signals from inputs 3T and 4T can be redirected into outputs 3R and 4R respectively. As will be understood by those of skill in the art any number and combination of mirrors can be utilized to create any combination between the inputs and outputs and the embodiments of the present disclosure or not limited by the arrangement illustrated in FIGS. 3A and 3B.

In the embodiment of FIG. 3B, the optical signal 328 is illustrated as being redirected from input 3T into output 3R. In the embodiment illustrated in FIG. 3B, the mirror is oriented normal to the plane of the optical signal 328 in one dimension.

However, in various embodiments, each mirror can be tuned to be more or less than normal to the plane of the signal. Such embodiments can be useful in adjusting the switch as the components age, adjust due to an optical signal that is at an undesirable angle when entering free space 332, and/or for reducing the intensity of the optical signal by deflecting some of the light away from the outputs 338.

The control of the mirrors can be accomplished by one or more control logic components. In various embodiments, these components can be used to control one or more mirrors, the control can be independent, or as a group, and/or the control logic can perform analysis to determine which mirror(s), and/or at what angle, the mirror(s) should be tuned to. In some embodiments, one or more of the mirror(s) are not tunable and have a set position to which they are actuated.

The embodiment of FIG. 3B also directs the light back in the direction it came (i.e., the left side). Such a configuration may be useful in providing diagnostics by sending a return signal back in the direction it came, however, embodiments of the present disclosure are not so limited.

Figure 4:
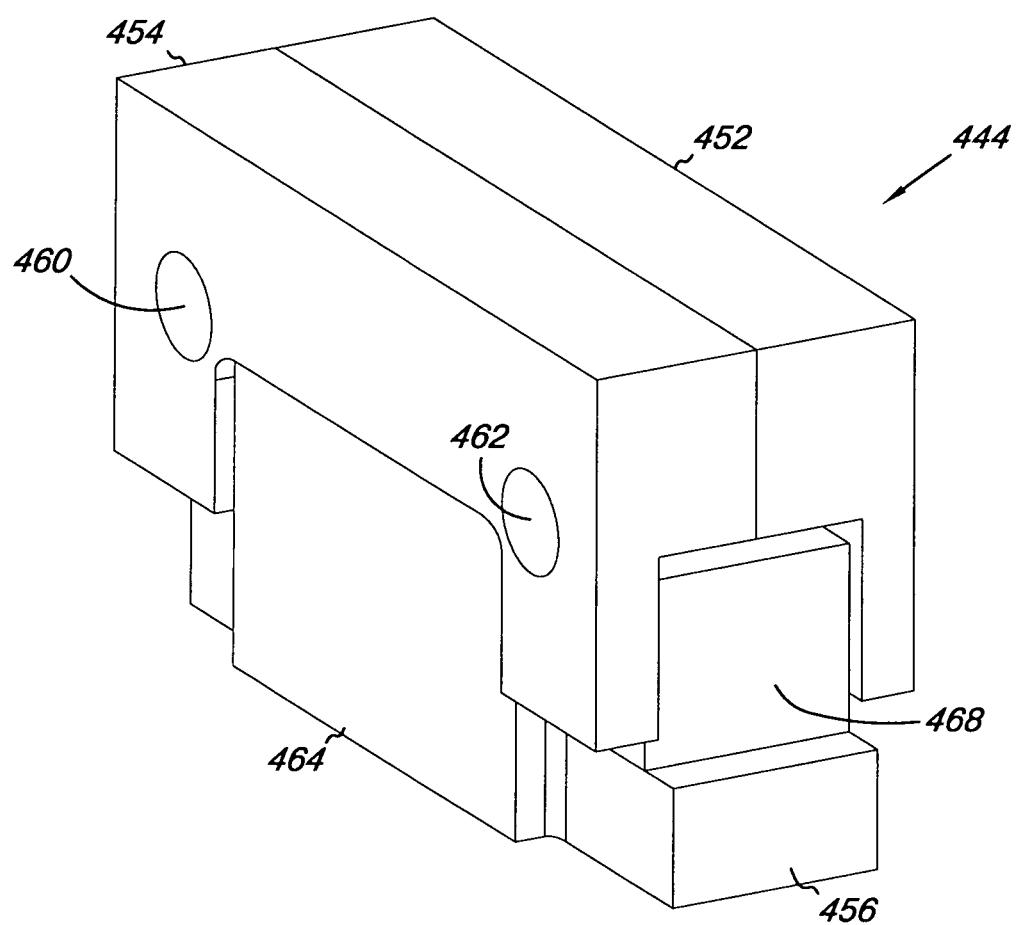
FIG. 4 is a perspective view of a switch embodiment of the present disclosure.
Figure 5:
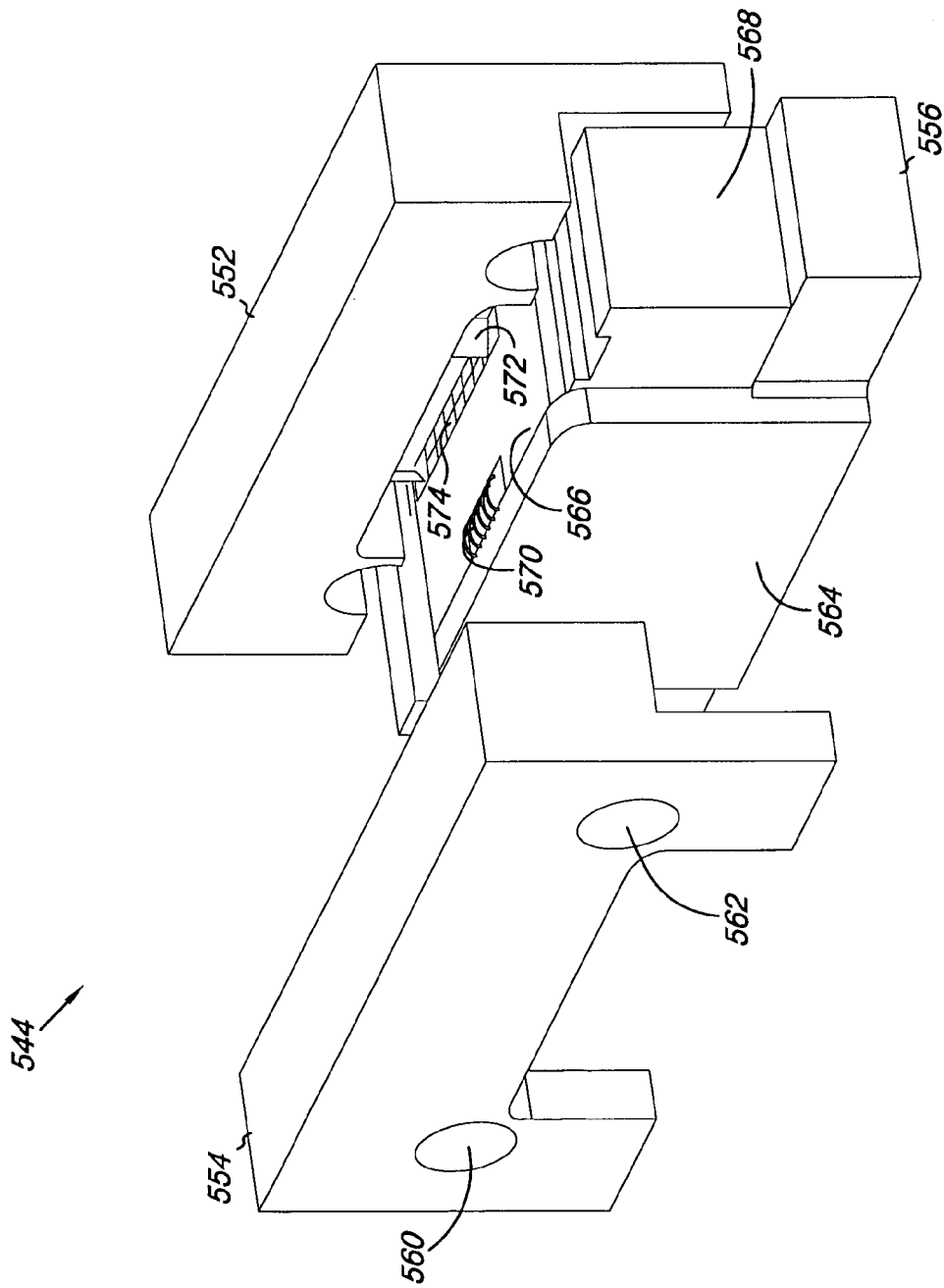
FIG. 5 is a semi-exploded perspective view of the switch embodiment represented in FIG. 4.
Figure 6:
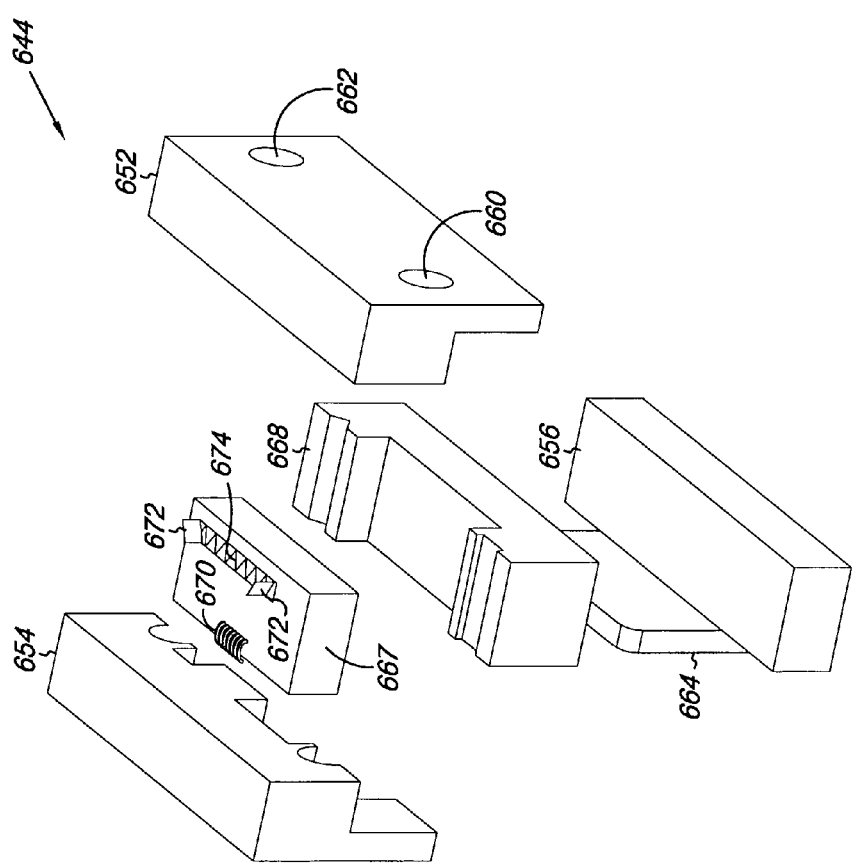
FIG. 6 is a further exploded perspective view of the switch embodiment represented in FIG. 4.

FIG. 4 is a perspective view of a switch embodiment of the present disclosure. FIG. 5 is a semi-exploded perspective view of the switch embodiment represented in FIG. 4. FIG. 6 is a further exploded perspective view of the switch embodiment represented in FIG. 4.

The embodiment of FIGS. 4-6 provides a MEMS substrate that is disposed parallel to the light source transmission. The parallel MEMS switch 444, for example, includes a transceiver lens component 452 mated to a backpanel lens component 454 and a MEMS substrate holder 456.

Transceiver lens component 452 and backpanel lens component 454 can include alignment holes 460 and 462 for aligning switch 450 with an MT Connector (not shown). Also illustrated in FIG. 4 are an input/output (I/O) transition block 464 and a MEMS substrate 468 which will be described in more detail below.

As illustrated in the embodiment of FIG. 5, the transceiver lens component 552 and backpanel lens component 554 (with alignment holes 560 and 562) create a frame to support disposition of an I/O transition block 564 that is perpendicular to MEMS component 566 and MEMS substrate 568 which is provided on MEMs substrate holder 556. As shown in the previous embodiments, the optical signal switch 544 includes a first lens array mounted on the transceiver lens component 552 and a second lens array mounted on the backpanel lens component 554 for directing an optical signal through a region of freespace inside the switch housing.

As illustrated in FIG. 5, wirebond sites 570 electrically connect I/O transition block 564 to the MEMS component 566 for control purposes. In some embodiments, voltage commands through I/O transition block 564 could activate the MEMS component required to create the diagnostic feedback loop. An electrical bus (not shown) would electrically connect the parallel MEMS switch 544 with an overall device controller.

FIG. 5 also illustrates one of a number of possible mirror embodiments. Mirrors 572 are shown on a MEMS rack 574, which is moved in a path perpendicular to the optical path. The fixed angle of incidence and set distance between the mirrors 572 allow for redirection of a light transmission from the transceiver to a receiver diode.

Other MEMS mirror systems include thermally actuated pop-up mirrors, electrostatic "zippers" actuated pop-up mirrors, and nano-tractor actuated pop-up mirrors. The pop-up designs require the mirrors to be preset in the optical path of a specific transmission and receiver optical line.

Such rack systems typically have at least a pair of fixed mirrors that travel into and out of the optical path. As in the horizontal design, the mirrors create a feedback loop that reflects an optical signal from a diode or VCSEL to an optical diagnostic analyzer such as a receiver diode for diagnostics.

FIG. 6, provides another perspective view of the components of FIG. 5. The embodiment of FIG. 6, the device 644 includes a transceiver lens component 652 and backpanel lens component 654 (with alignment holes 660 and 662) that create a frame to support disposition of an I/O transition block 664 that is perpendicular to MEMS component 667 and MEMS substrate 668 which is to be positioned on MEMs substrate holder 656. The optical signal switch 644 includes a first lens array mounted on the transceiver lens component 652 and a second lens array mounted on the backpanel lens component 654 for directing an optical signal through a region of freespace inside the switch housing.

As illustrated in FIG. 6, wirebond sites 670 are utilized to electrically connect I/O transition block 664 to the MEMS component 667 for control purposes. FIG. 6 also provides a number of mirrors 672 on a MEMS rack 674.

Figure 7:
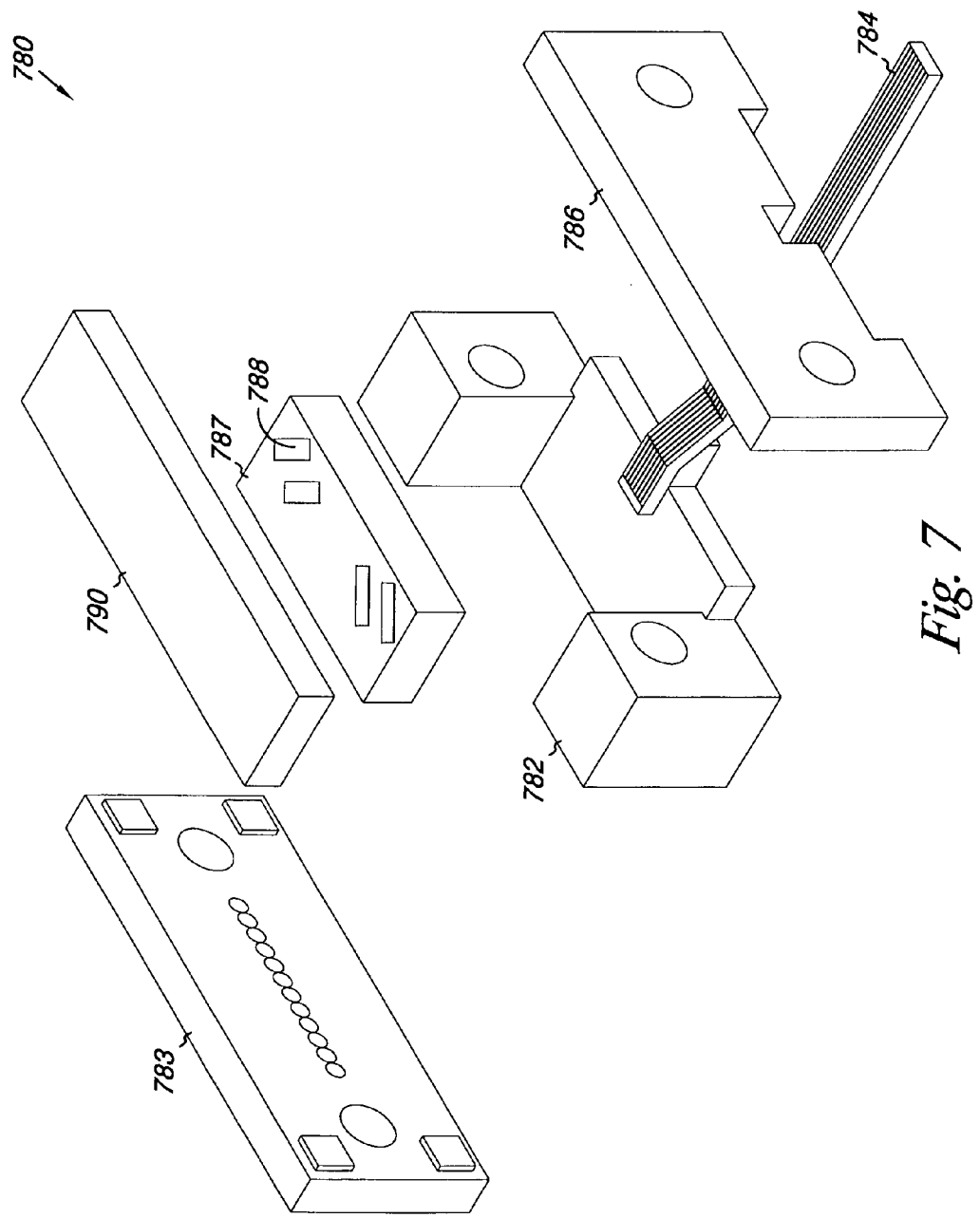
FIG. 7 is an exploded perspective view of the components of a MEMS device in manufacture according to an embodiment of the present disclosure.

FIG. 7 is an exploded perspective view of the components of a MEMS device in manufacture according to an embodiment of the present disclosure. Similarly to the exploded view of FIG. 6, FIG. 7 illustrates another embodiment of a MEM device. The embodiment illustrated in FIG. 7 the device 780 includes a number of optical lens subassemblies 783 and 786, a MEMS component 787 having a number of mirrors 788 formed thereon, a submount 782 with wire leads 784 and a cover 790.

Figure 8:
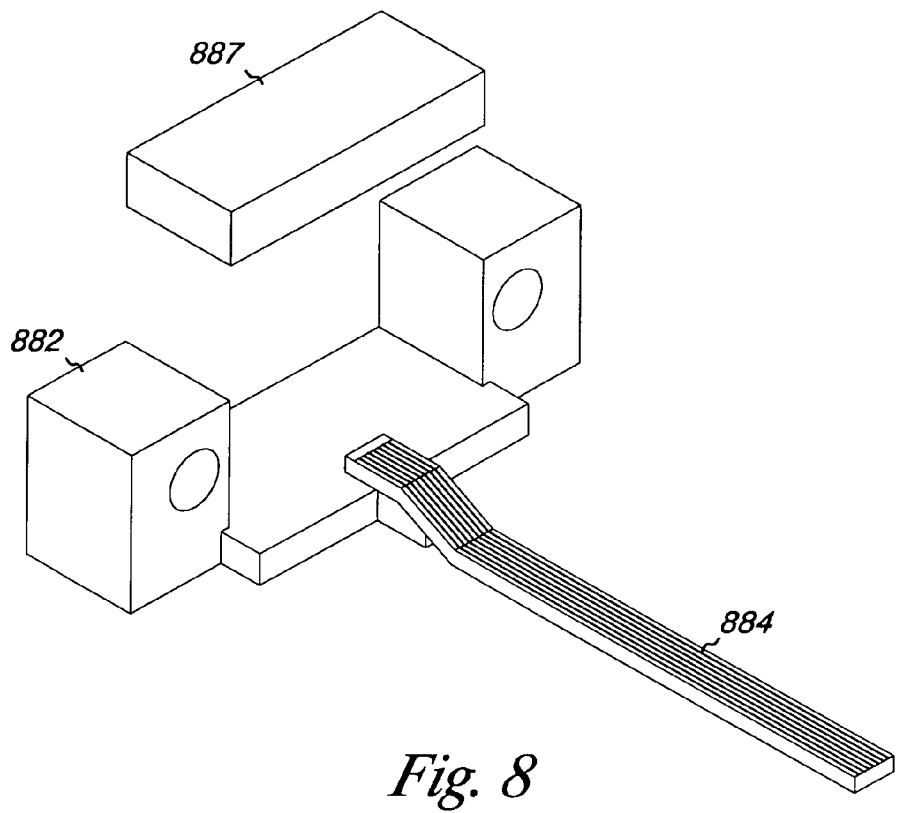
FIG. 8 represents a step in a manufacturing process according to an embodiment of the present disclosure.

FIG. 8 represents a step in a manufacturing process according to an embodiment of the present disclosure. In FIG. 8, the MEMS component 887 has been formed, but the release has not yet been done on the component. In the illustrated embodiment, the MEMS component is attached to the submount 882. The wire leads 884 are also attached to the submount.

Figure 9:
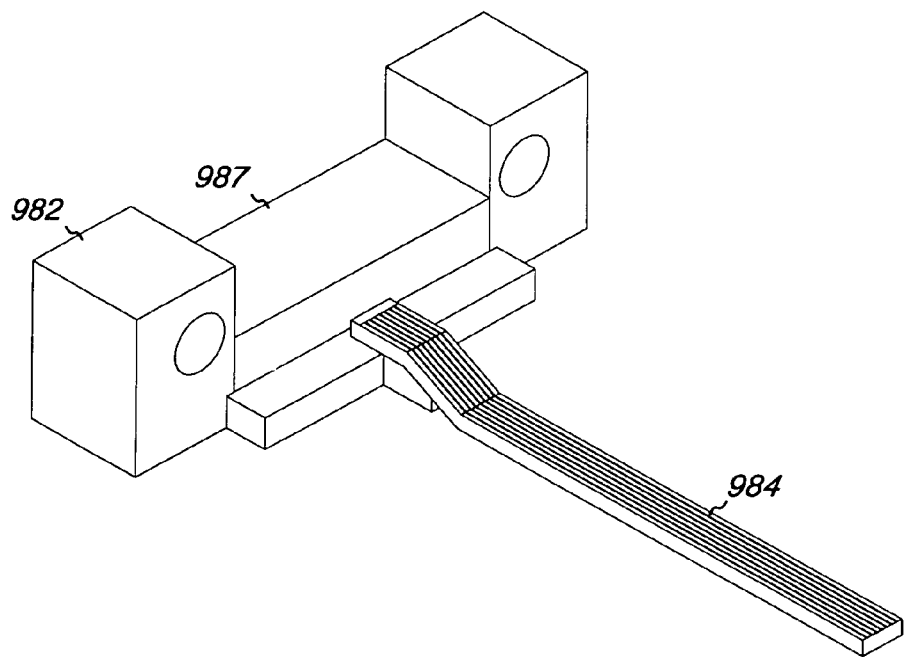
FIG. 9 represents another step in a manufacturing process according to an embodiment of the present disclosure.

FIG. 9 represents another step in a manufacturing process according to an embodiment of the present disclosure. FIG. 9 illustrates the MEMS component 987 in a pre-release state positioned on the submount 982 with the leads 984 in position.

Figure 10:
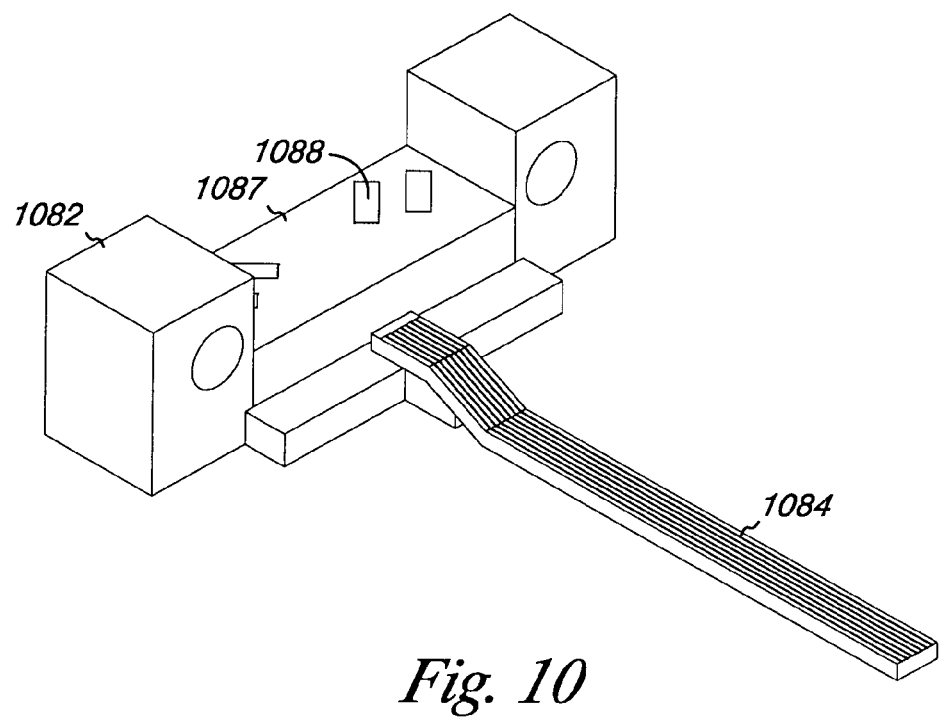
FIG. 10 represents another step in a manufacturing process according to an embodiment of the present disclosure.

FIG. 10 represents another step in a manufacturing process according to an embodiment of the present disclosure. In the illustration of FIG. 10, the release process has been done on the MEMS component 1087 while it has been positioned on the submount 1082 and the mirrors 1088 have been defined for actuation.

Figure 11:
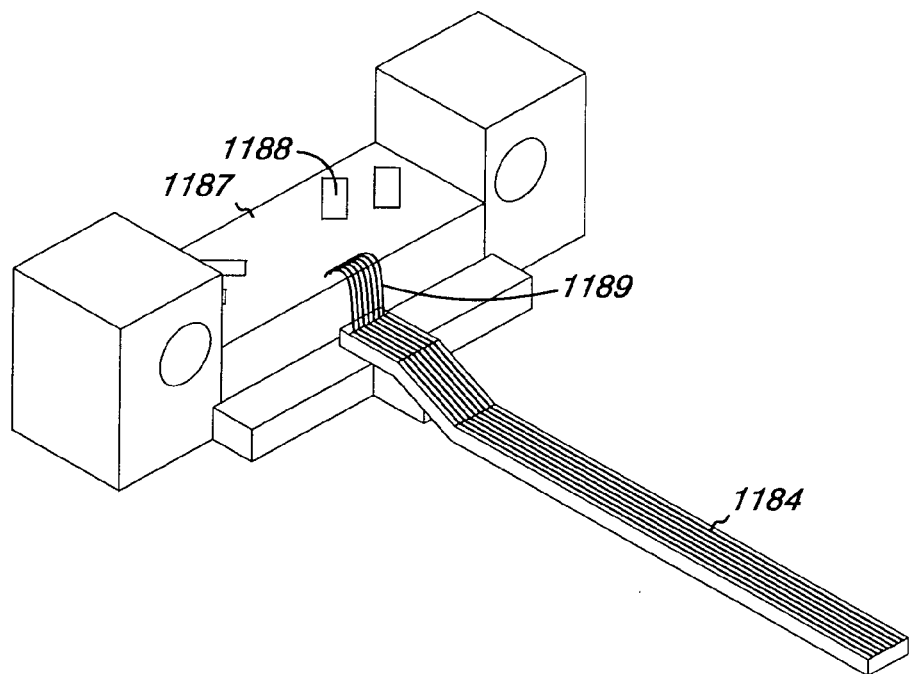
FIG. 11 represents another step in a manufacturing process according to an embodiment of the present disclosure.

FIG. 11 represents another step in a manufacturing process according to an embodiment of the present disclosure. In the illustration of FIG. 11, the wire leads have been bonded (e.g., wirebonds 1189) to the MEMS component 1187, positioned on the submount 1182, thereby providing a power source and/or control line (e.g., for communication of actuation signals) for the mirrors 1188. Actuation signals can, for example, be provided by electrical pulses through the wire leads 1184.

Figure 12:
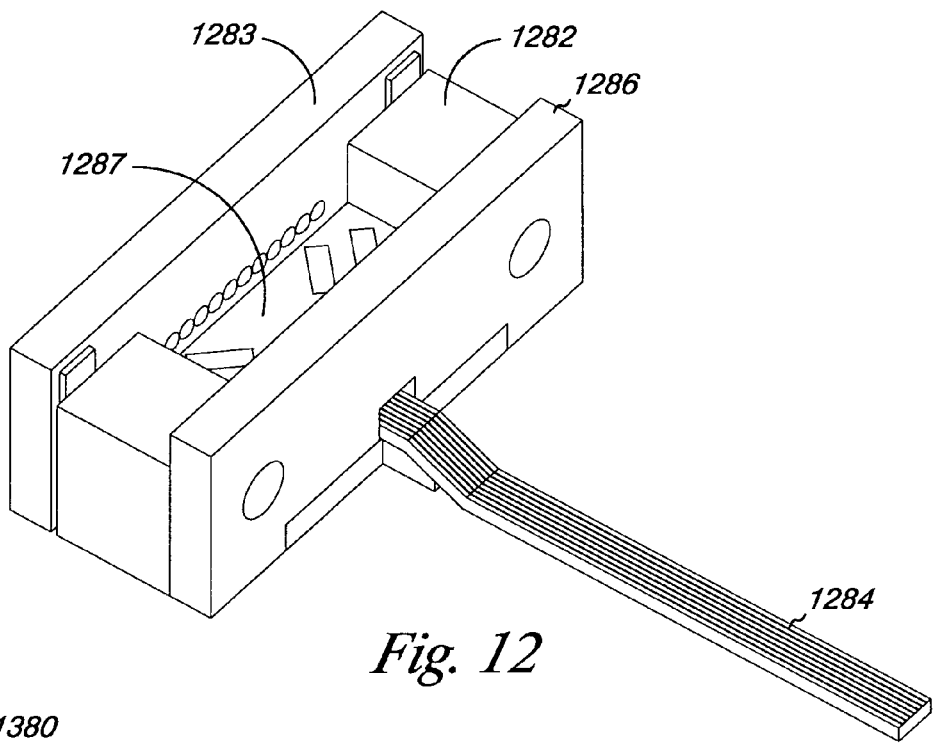
FIG. 12 represents another step in a manufacturing process according to an embodiment of the present disclosure.

FIG. 12 represents another step in a manufacturing process according to an embodiment of the present disclosure. FIG. 12 illustrates the adding of two lens assemblies 1283 and 1286 to the submount 1282 and MEMS component 1287. As discussed above, some embodiments can include more or less lens assemblies having more or less lenses including embodiments having no lenses.

Figure 13:
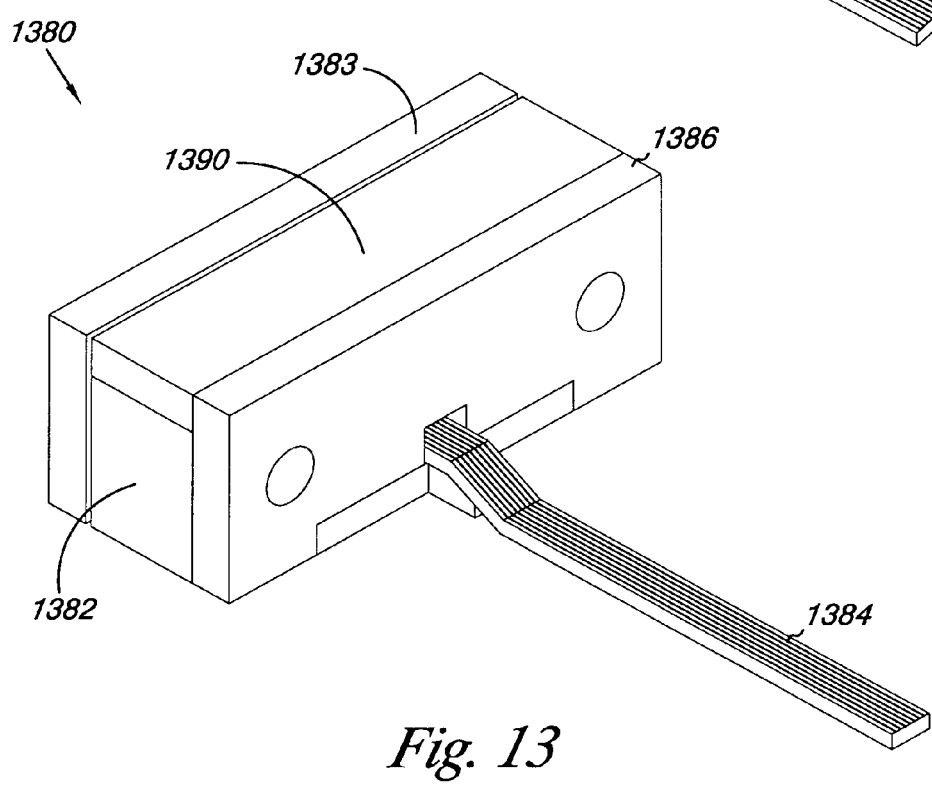
FIG. 13 represents another step in a manufacturing process according to an embodiment of the present disclosure.

FIG. 13 represents another step in a manufacturing process according to an embodiment of the present disclosure. FIG. 13 illustrates an assembled MEMS device having submount 1382, lens assemblies 1383 and 1386, wire leads 1384, and a cover 1390. Utilization of a cover in some embodiments can reduce or eliminate the influence of dirt or other particulate on the optics of the MEMS device 1380, particularly if water tight or hermetically sealed, among other sealing techniques.

Figure 14:
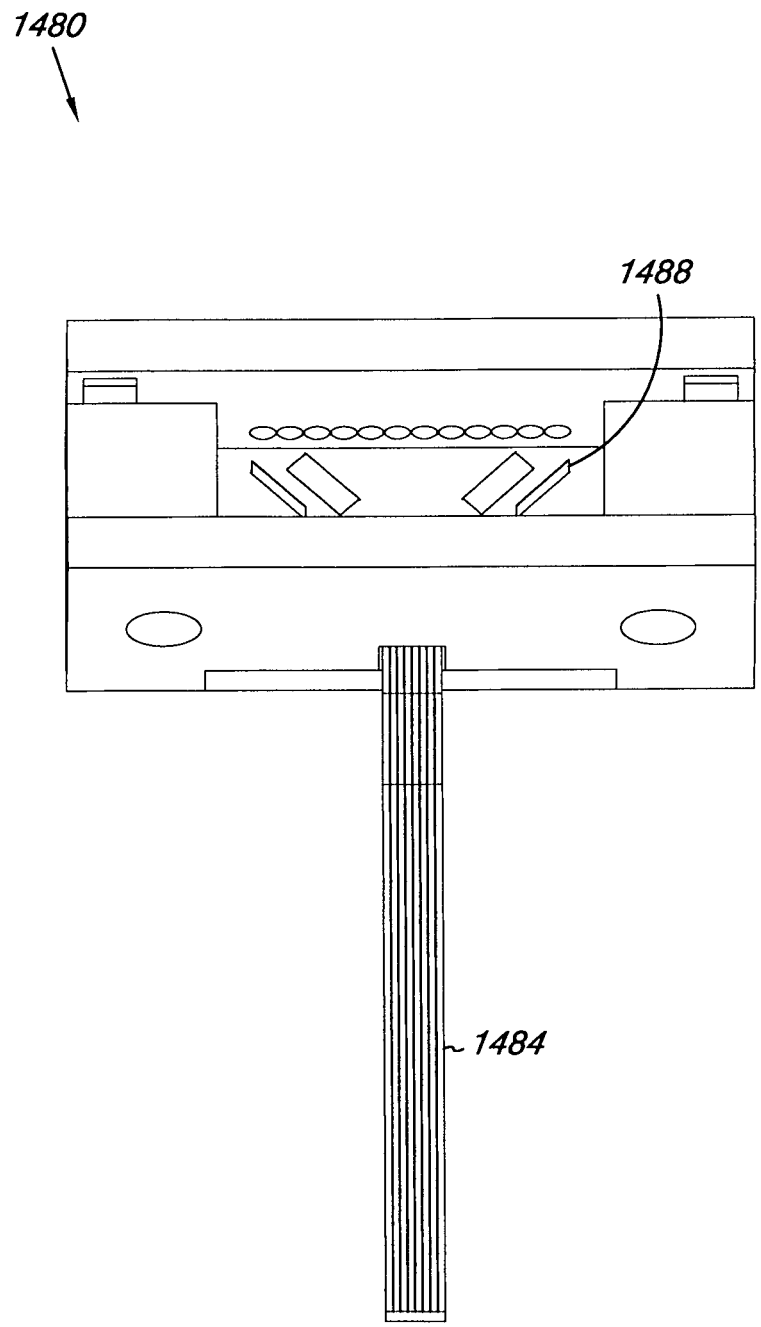
FIG. 14 is a top view of an assembled MEMS device with mirrors in a first configuration according to an embodiment of the present disclosure.

FIG. 14 is a top view of an assembled MEMS device with mirrors in a first configuration according to an embodiment of the present disclosure. In the embodiment of FIG. 14, the MEMS device 1480 has no cover to illustrate the mirrors are shown actuated in a particular configuration where the outer two mirrors have at least a portion of the mirror rotated into the plane of the optical signal.

Figure 15:
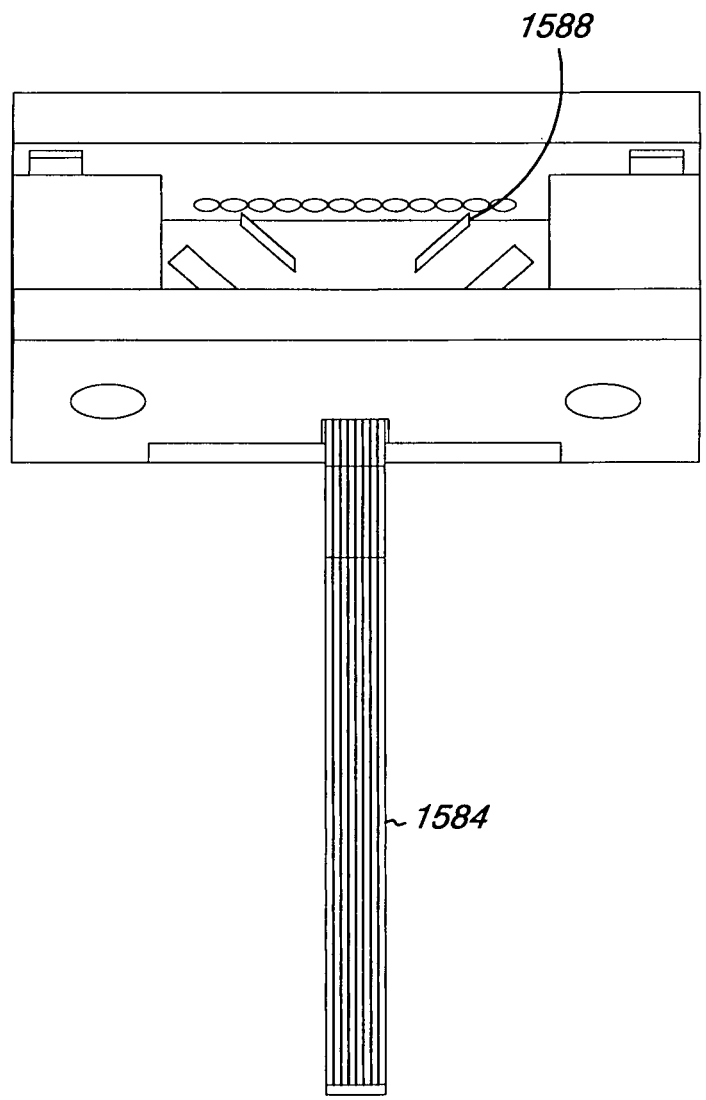
FIG. 15 is a top view of an assembled MEMS device with mirrors in a first configuration according to an embodiment of the present disclosure.

FIG. 15 is a top view of an assembled MEMS device with mirrors in a first configuration according to an embodiment of the present disclosure. In the embodiment of FIG. 15, the MEMS device also has no cover to illustrate the mirrors are shown actuated in a different particular configuration where the inner two mirrors have at least a portion of the mirror rotated into the plane of the optical signal. As discussed above, this actuation can be provided, for example, by signals from a control logic component via wire leads 1584.

Figure 16:
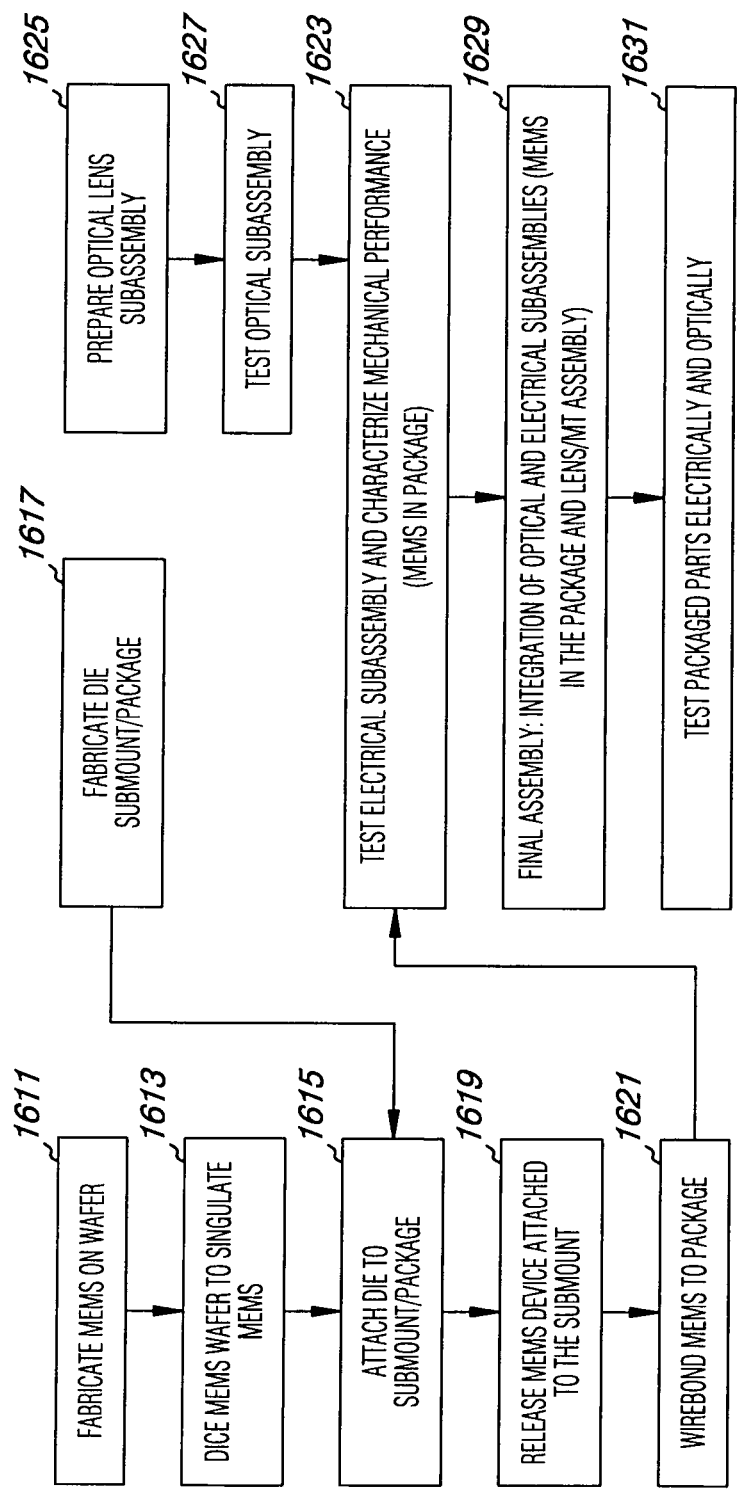
FIG. 16 represents a method for providing a manufacturing process according to an embodiment of the present disclosure.

FIG. 16 represents a method for providing a manufacturing process according to an embodiment of the present disclosure. In the embodiment of FIG. 16, the method includes forming at least one micro electro mechanical system (MEMS) on a substrate (e.g., fabricating a MEMS component on a wafer at block 1161).

The method also includes forming at least one die submount (e.g., fabricate die submount/package at block 1617). Method embodiments can also include dicing the substrate to singulate each MEMS to form at least one unreleased MEMS die (e.g., dice MEMS wafer to singulate MEMS at block 1613).

In various embodiments, the method can include attaching the at least one unreleased MEMS die to one of the at least one submounts (e.g., attach die to submount/package at block 1615). Once placed onto the submount, the release process can be accomplished such that a release is performed on the MEMS die while it is attached to the submount (e.g., release MEMS device attached to the submount at block 1619). The MEMS die can then be wirebonded to the submount to form a MEMS device (e.g., wirebond MEMS to package at block 1621).

In some embodiments, one or more optical subassemblies can be utilized (e.g., prepare optical lens subassembly at block 1625). This can include, for example, mounting the at least one optical subassembly onto the MEMS device and/or integrating the at least one optical subassembly into the MEMS device, such as during the fabrication process.

In some embodiments, the optical subassembly can be tested prior to integration or attachment to the MEMS device, such as is indicated at block 1627. In some such embodiments, methods can include testing the MEMS device to determine its electrical and mechanical performance (e.g., testing the electrical subassembly and/or characterization of mechanical performance of the MEMS device as packaged, as discussed in block 1623 or test packaged parts electrically and optically at block 1631 after final assembly at block 1629, among other testing methods and/or points in the process).

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the disclosure includes various other applications in which the above structures and methods are used. Therefore, the scope of various embodiments of the disclosure should be determined with reference to the appended claims, along with the full range of equivalents to which such claims are entitled.

Additionally, in reading this disclosure and claims, it should be noted that the indefinite article "a" or "an", as it is used herein, is not intended to limit the number of elements to one. Accordingly, the terms "a" and "an" should be viewed as meaning one or more unless such limitation is expressly stated or such meaning would be illogical based upon the arrangement of elements formed by such meaning. Further, the term "a number of" should be interpreted as meaning one or more.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. An optical switch comprising;
    at least one micro electro mechanical system type pivot mirror structure disposed along a path of an optical signal, the structure having;
    a mirror;
    an actuator; and
    a control logic component, including logic instructions executable for actuating the mirror such that the optical signal is routed to a particular output based upon instructions received by the control logic component;
    wherein the mirror includes a pivot axis along a first edge and a second edge rotatable with respect to the pivot axis via the actuator, the mirror being rotatable between a position parallel to a plane of an optical signal and a position substantially normal to the plane of the optical signal, wherein the mirror can be tuned to one or more positions other than the position parallel to the plane and the position normal to the plane, including one or more positions beyond the position normal to the plane of the optical signal.

2. The optical switch of claim 1 where the mirror is constructed having a spring force as the actuator that moves the mirror from the position substantially normal to the plane of the optical signal to the position parallel to the plane of the optical signal.

3. The optical switch of claim 1 where the mirror is constructed having a thermally actuated pivot mechanism as the actuator that moves the mirror from the position parallel to the plane of the optical signal to the position substantially normal to the plane of the optical signal.

4. The optical switch of claim 1 where the mirror is constructed having a electro-static zipper actuated pivot mechanism as the actuator that moves the mirror from the position parallel to the plane of the optical signal to the position substantially normal to the plane of the optical signal.

5. The optical switch of claim 1 where the mirror is constructed having a nano-tractor actuated pivot mechanism as the actuator that moves the mirror from the position parallel to the plane of the optical signal to the position substantially normal to the plane of the optical signal.

6. The optical switch of claim 1 where the mirror is planar and has an optimal angle of 90 degrees to the plane of the optical signal in at least one special dimension.

7. An optical switching system comprising;
    at least one micro electro mechanical system type pivot mirror structure disposed along a path of an optical signal, the structure having a mirror and an actuator;
    the mirror having a pivot axis along a first edge and having a second edge rotatable with respect to the pivot axis via the actuator, the mirror being rotatable between a position parallel to a plane of an optical signal and a position where at least a portion of the mirror is rotated into the plane of the optical signal, wherein the mirror can be tuned to one or more positions other than the position parallel to the plane and the position where at least a portion of the mirror is rotated into the plane, including one or more positions beyond a position normal to the plane of the optical signal;
    a number of optical input paths for directing the optical signal toward at least one of the pivot mirror structures;
    a number of optical output paths for receiving the optical signal from at least one of the pivot mirror structures; and
    a control logic component for actuating one or more of the at least one mirror structures via the actuator, wherein the control logic component includes logic instructions executable for actuating one or more of the at least one mirror structures such that the optical signal is routed to a particular output based upon instructions received by the control logic component.

8. The system of claim 7 where the control logic component includes logic instructions executable for actuating one or more of the at least one mirror structures such that the optical signal is directed to a bypass output to bypass a particular optical output path when a fault in the particular output path has been detected.

9. The system of claim 7 where the system includes multiple units each having:

at least one micro electro mechanical system type pivot mirror structure disposed along a path of an optical signal, the structure having a mirror and an actuator;

the mirror having a pivot axis along a first edge and having a second edge rotatable with respect to the pivot axis via the actuator, the mirror being rotatable between a position parallel to a plane of an optical signal and a position where at least a portion of the mirror is rotated into the plane of the optical signal;

a number of optical input paths for directing the optical signal toward at least one of the pivot mirror structures;

a number of optical output paths for receiving the optical signal from at least one of the pivot mirror structures; and where the control logic component includes logic instructions executable for actuating one or more of the at least one mirror structures on a first unit of the multiple units such that the optical signal is routed to a particular output on a second unit of the multiple units based upon instructions received by the control logic component.

10. The system of claim 7 where the system includes a number of lenses for receiving optical signal information directed at the system in free space, each of the number of lenses positioned to direct the optical signal information to one of the number of optical input paths.

11. The system of claim 7 where the control logic component includes logic instructions executable for analyzing an affect of an interaction of a mirror with an environmental condition.

12. The system of claim 7 where the control logic component includes logic instructions executable for actuating one or more of the at least one mirror structures to direct a portion of the optical signal away from all of the optical output paths.

13. The system of claim 7 where the control logic component includes logic instructions executable for adjusting a mirror structure alignment to a beyond optimal position for optical communication and instructions to adjust the mirror structure alignment back to the optimal position from the beyond optimal position.

14. The system of claim 7 where the control logic component includes logic instructions executable for adjusting mirror structure alignment by analyzing a signal strength via utilizing a number of signal strength measurements taken over a first period of time and for a signal utilizing a particular input path of the number of optical input paths, one or more particular mirror structures of the at least one mirror structures, and a particular output path of the number of optical output paths and where the control logic component includes logic instructions executable for actuating the one or more particular mirror structures adjust an amount of rotation for at least one of the one or more particular mirror structures based upon the analysis.

15. The system of claim 14 where the control logic component includes logic instructions executable for comparing the number of signal strength measurements taken over the first period of time and a second period of time and where the control logic component includes logic instructions executable for determining whether the adjustment based upon the analysis of the signal strength measurements over the first period of time increased or decreased the signal strength and where the control logic component includes logic instructions executable for actuating the one or more particular mirror structures adjust an amount of rotation for at least one of the one or more particular mirror structures based upon the determination.

* * * * *